United States Patent [19]

Ikemoto

[11] Patent Number: 4,573,134

[45] Date of Patent: Feb. 25, 1986

[54] TALKING CLOCK CALCULATOR

[75] Inventor: Yutaka Ikemoto, Nara, Japan

[73] Assignee: Sharp Kabushiki Kaisha, Osaka, Japan

[21] Appl. No.: 469,392

[22] Filed: Feb. 24, 1983

[30] Foreign Application Priority Data

Feb. 24, 1982 [JP] Japan ................................ 57-29554

[51] Int. Cl.[4] ........................ G04B 21/08; G01L 1/00

[52] U.S. Cl. .................................... 364/705; 364/710; 368/63; 381/51

[58] Field of Search .................. 364/705, 710; 368/63; 381/51, 53

[56] References Cited

U.S. PATENT DOCUMENTS

| | | | |
|---|---|---|---|
| 4,266,096 | 5/1981 | Inoue et al. | 368/63 |
| 4,276,444 | 6/1981 | Tanimoto et al. | 381/51 |
| 4,282,404 | 8/1981 | Tanimoto et al. | 381/51 |
| 4,379,640 | 4/1983 | Inoue | 368/63 |
| 4,429,182 | 1/1984 | Masuzawa et al. | 381/51 |

*Primary Examiner*—David H. Malzahn

*Attorney, Agent, or Firm*—Birch, Stewart, Kolasch & Birch

[57] ABSTRACT

A talking clock calculator incorporates a variety of time representing functions (or calender function), and is particularly characterized by means for representing the date information.

This apparatus is capable of verbally outputting the month and date by operating the DATE key in the Normal mode, and also the year, month, and date, by operating the DATE key in the Set mode. The verbal output can be made as short as possible in the simplest sentence for easier recognition or the year information can also be verbally represented, whereby the apparatus can be conveniently used as a "fully automatic calender". Since voice data can be used by the clock and the calculator, there is no need for providing each with own voice data independently.

1 Claim, 13 Drawing Figures

TALKING CLOCK CALCULATOR

BACKGROUND OF THE INVENTION

The present invention relates to an electronic apparatus capable of verbally reported date information. A calculator or other electronic apparatus is provided with means for indicating the date information. More particularly, the present invention relates to an electronic apparatus which is capable of verbally reporting the month and date by operating a "DATE" key in a Normal mode, and also the year, month, and date, by operating the "DATE" key in a Set mode. When verbally reporting such data in English, the contents can be made as short as possible in the simplest sentence for easier recognition. If desired, the year information can also be verbally reported, and so this apparatus can be conveniently used as a "fully automatic calender".

OBJECT AND SUMMARY OF THE INVENTION

The present invention primarily aims to provide an electronic apparatus which is characterized in that, when any of the desired information instruction keys is operated, in respective modes of operation, it verbally outputs the date information either excluding the year or including it.

An electronic apparatus according to the present invention is provided with an ON/OFF mode switch for the verbal reporting operation. Even when this switch remains OFF, any desired display contents can be verbally reported merely by operating the verbal report instruction key without turning the switch ON.

An electronic apparatus according to the present invention may verbally report the month and date by operating the DATE key in the Normal mode, while it also verbally reports the year, month, and date by operating the DATE key in the Set mode. Therefore, the verbal output can be made very short and simple so that the speech can easily be heard and recognized, or if desired, such data containing the year information can also be verbally reported, and so this apparatus can be conveniently used as a fully automatic calender so that the user can enjoy easier operations.

Still further characteristics of an electronic apparatus according to the present invention are described below.

(1) When the verbal report instruction key is operated, any information corresponding to the data contents being displayed, such as time, calculation results, and calender can be verbally reported. For example, when the time is being displayed and instruction key pressed, the time information is verbally reported. When a calculation result is being displayed and instruction key pressed, the result can be verbally reported in the decimal notation, and when the calender mode is displayed and the instruction key pressed, month, and date and can be verbally reported.

As a result, since it is not necessary to select and operate different keys corresponding to various desired data, the data needed can be instantly output by speech means.

(2) Since the clock and calculator commonly use numerical speech data, it is not necessary to provide each with its own numerical speech data, which reduces the cost.

(3) The electronic apparatus verbally reports the state being set by operating the state inversion key. For example, whenever either the [AM-PM] setting key or ALARM ON/OFF key is operated, data can be verbally output so that the user can easily recognize the existing state without visually confirming the display.

(4) When the state inversion key is operated when the [ALARM] key has been actuated, the contents are variable between the ALARM ON and ALARM OFF modes. Specifically, when the [ALARM] key is operated in the Normal mode, an alarm time is then displayed, and if the ALARM ON state exists during this period, then speech, for example, "ALARM SET FOR NINE TEN AM" is verbally output. If the ALARM OFF state exists, a simple speech "ALARM" is then verbally output so that the state actually being set by the alarm state inversion key can easily be recognized during the ALARM key operation.

DETAILED DESCRIPTION OF THE INVENTION

Figure 1:
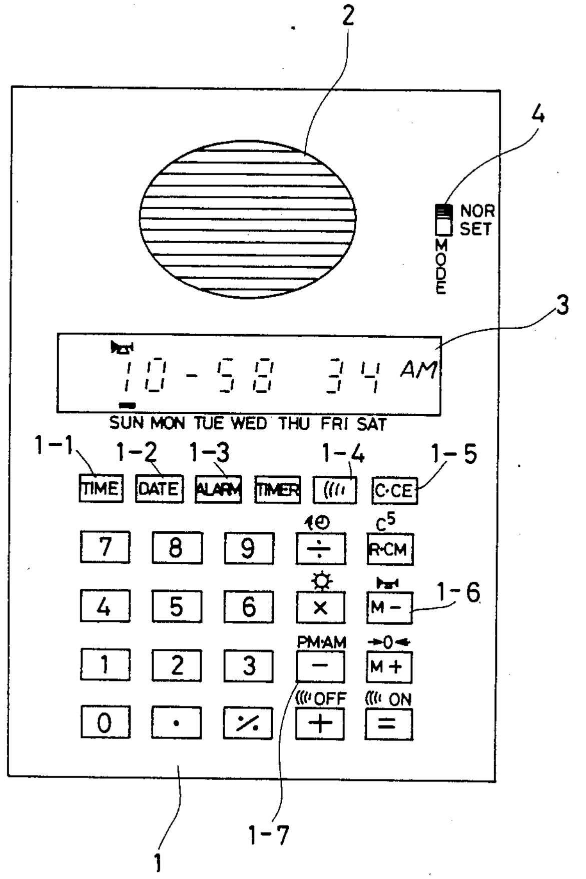
FIG. 1 shows a front view of a talking clock calculator of a preferred embodiment of the present invention.

FIG. 1 shows the front view of a talking clock calculator of a preferred embodiment of the present invention, where symbol 1 represents the keyboard provided with the digital, arithmetic operation and mode select input keys. Symbol 1-1 represents a time key for instructing the display of the actual time and the output of the verbal data in the Normal mode, and also for the setting of the actual time in the Set mode. Symbol 1-2 represents a date key that displays the date (year, month, and date) and verbally reports the month and date in the Normal mode, while said date key also sets the date in the Set mode and verbally outputs the year, month, and date. Symbol 1-3 represents the ALARM key that sets an alarm time and confirms the alarm time being set. Symbol 1-4 represents the verbal report instruction key for verbally outputting data corresponding to the contents being displayed during its operation.

Symbol 1-5 represents the clear key. Symbol 1-6 represents the alarm state inversion key that executes ON/OFF operations of the alarm output. Symbol 1-7 represents the clock state inversion key designating either the AM or PM cycle in the Set mode. Symbol 3 represents the display device, while symbol 4 represents the mode select switch between the Normal and Set modes.

Figure 2:
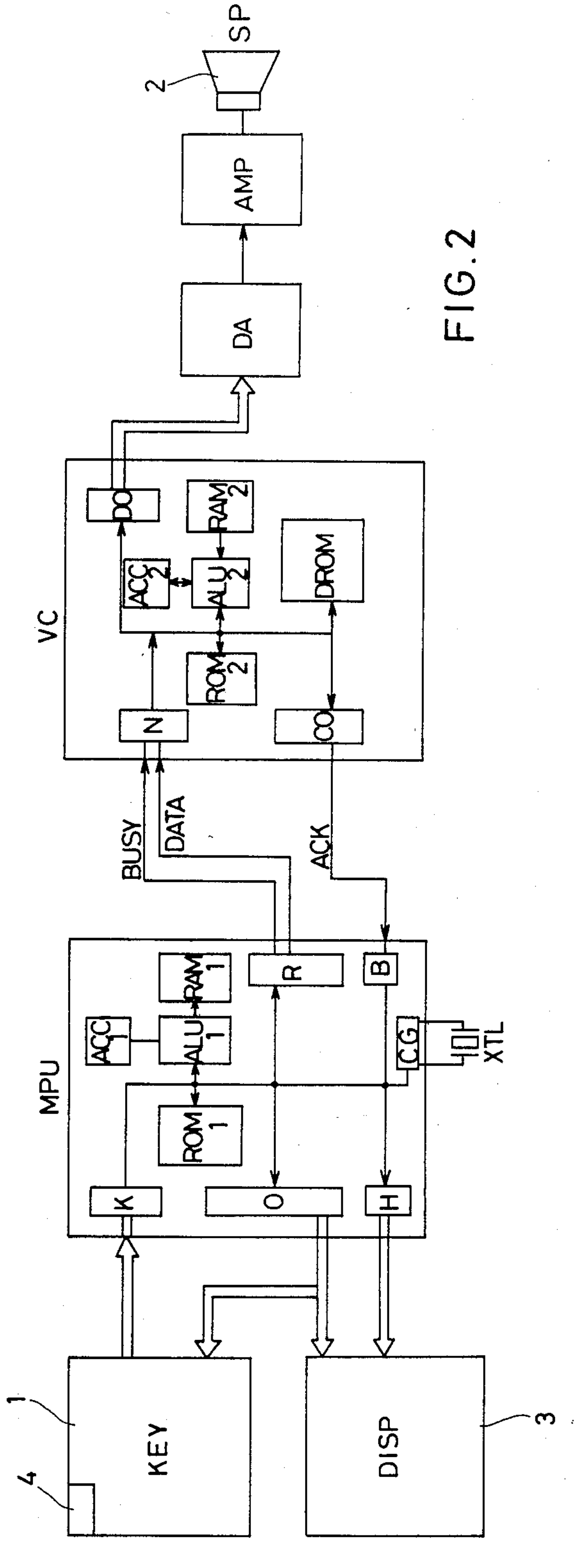
FIG. 2 shows a simplified block diagram of the talking clock calculator shown in FIG. 1.

FIG. 2 shows a simplified block diagram of the talking clock calculator embodied by the present invention. Symbol 1 (or KEY) represents the mode select switch and other key input circuits. Symbol 2 (or SP) represents speaker, and symbol 3 (or DISP) represents the time display.

MPU is the microprocessor unit. VC is the voice synthesizer unit. DA is the digital/analogue converter. AMP is an amplifier. These are connected to each other as shown in FIG. 2. The microprocessor MPU is provided in its input/output ports with the key input signal buffer K, buffer 0 for the key strobe and display segment signal outputs, common signal output buffer H, buffer R that outputs signals to the voice synthesizer unit VC, and buffer B that receives signals from the voice synthesizer unit VC.

XTL represents a crystal oscillator. Pulses output from this oscillator are then converted into the reference frequency signals by the oscillator CG. The reference frequency signals are then counted so that they can be used as the clock counting data.

Figure 3:
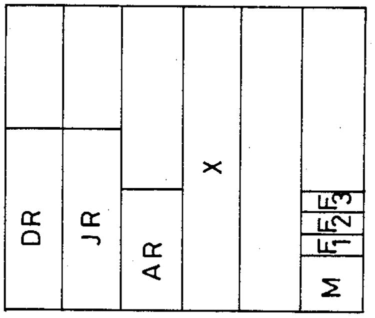
FIG. 3 schematically construction of read-write memory RAM 1 of FIG. 2.

ROM 1 is the read-only memory that preliminarily stores the program command, RAM 1 is the read-write memory used as either the register or flag (FIG. 3). ALU is the arithmetic operation circuit. ACC1 is the accumulator. The microprocessor MPU transmits a variety of codes related to data that must be fed to the voice sythesizer VC. The voice synthesizer VC is also provided in its input/output ports with buffer N that receives the data codes from the microprocessor MPU, the output buffer CO, and the voice signal output buffer DO.

ROM 2 is the other read-only memory storing the program command for synthesizing voice signals from the words that correspond to the pre-designated codes, RAM 2 is the read-write memory that can be used as either the register or flag. ALU2 is the other arithmetic operation circuit. ACC2 is also the other accumulator, and DROM is also a read-only memory that preliminarily memorizes the compressed voice data.

The voice synthesizer unit VC and the microprocessor unit MPU are connected to each other by means of the busy line BUSY, data signal line DATA, and the acknowledge signal line ACK, as shown in FIG. 2.

FIG. 3 shows the construction of the read-write memory RAM 1 of the microprocessor MPU. DR is the counter memorizing today's date. JR is the counter memorizing the actual time. AR is the counter memorizing the alarm time. X is the display register, while M is the counter that determines the contents of the speech output by operation of the time report instruction key 1-4. This talking clock calculator verbally reports the display contents in a blunt manner when the contents of the counter remains zero, whereas it verbally reports the display contents according to the decimal order when the contents of the counter are read at "1", and it verbally reports time when said contents are read at "2", while it also verbally reports the date (month and date) when said contents are read at "3". F1 is a flag showing that no signal is being input by means of the digital keys. F2 is flag showing that the alarm can be output, while F3 is the flag that selectively displays PM in place of AM.

Figure 4:
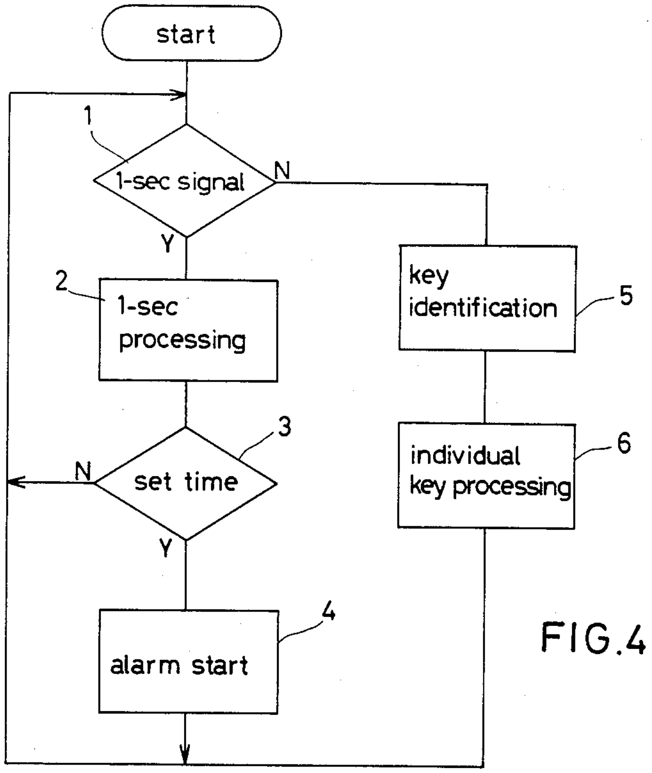
FIG. 4 shows a flow chart describing overall operations of a talking clock calculator according to the invention, and FIGS. 5 through 13 respectively show flow charts describing operational procedures in responding to each functional key.
Figure 5:
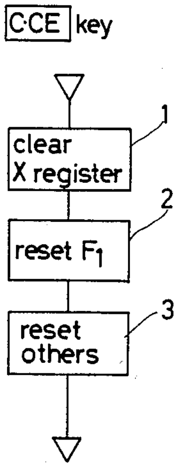

FIG. 4 shows a flow chart describing overall operations of the talking clock calculator embodied by the present invention. First, system operation is activated when either the 1 second signal is generated or the key input is fed. When the system operation is activated by the 1 second signal (step 1), the second value of the preset time is counted up (step 2). When a preset time has come (step 3), alarm can be output, i.e., both the speech and melody can be output, verbally reporting that the preset time has come (step 4). Conversely, if the system operation is activated by the key input, the pressed key is detected first (step 5) so that subsequent procedures can be executed (step 6) in responding to the key pressed.

Figure 6:
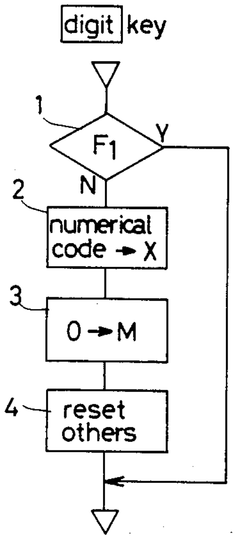

FIG. 6 shows a flow chart of the operation when the digital keys are pressed. When these keys are pressed, the existing condition of flag 1 is detected first (step 1), and if it is reset, i.e., if the digital key can be entered, a digital code data corresponding to the operated digital key is then input to the display register X whereby said data is then displayed (step 2), and then the counter M is reset so that said digital code data contents being displayed is read out (step 3) by the counter M. As a result, the speech corresponding to the digital code can be output.

Figure 7:
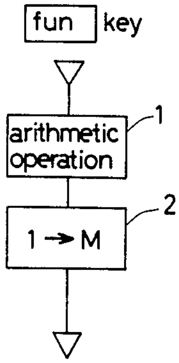

FIG. 7 shows a flow chart when any of the arithmetic operation keys (such as +, −, ×, ÷, =) is pressed. When any of these keys is pressed, an arithmetic operation in response to the pressed key is executed (step 1), then the contents of the mode setting counter M are set at "1" so that the display contents can be verbally output according to the decimal order.

Figure 8:
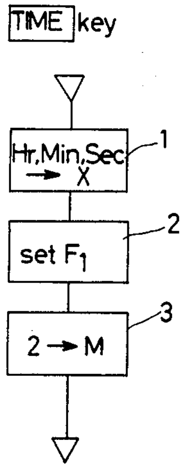

FIG. 8 shows the case where [TIME] key 1-1 is pressed. When this key is pressed, the hour, minute, and second data of the actual time memory counter JR are fed to the display register X (step 1). At the same time, flag F1 is set so that data from the digital keys are prevented from being entered (step 2), while the contents of the mode setting counter are set at "2" so that the condition will be entered where the time can be verbally reported (step 3). As a result, when the verbal report instruction key 1-4 is pressed in this state, the actual time can be verbally reported.

Figure 9:
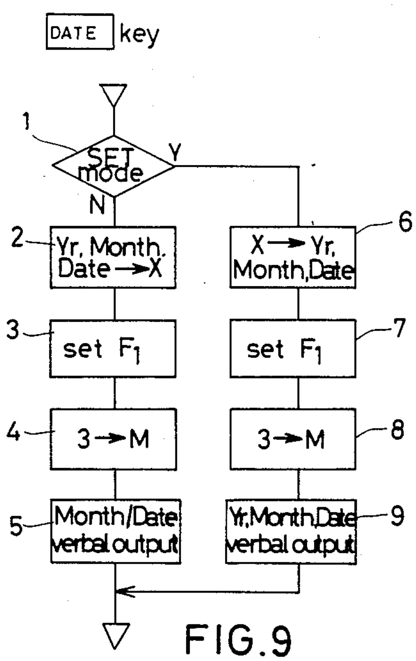

FIG. 9 shows a flow chart when the [DATE] key is pressed. When this key is pressed, an operation is activated to detect if either the Normal or Set mode is entered (step 1). If the Normal mode is entered, the year, month, and date information is input to the display register X (step 2), while flag F1 is set to prevent data from the digital keys from being entered (step 3), and then the contents of the mode setting register M is set at "3" so that the condition is entered where the time can be verbally reported (step 4), and finally, the contents of the counter D memorizing today's date information, i.e., only the month and date information, can be verbally reported. Conversely, if the Set mode is entered while the [DATE] key is pressed, those contents (year, month, and date) already input to the display register X are memorized by the counter DR (step 6), and so on flag F1 is set (step 7), and then the contents of the register M is set at "3", and finally all the contents of said counter DR, i.e., the year, month, and date, are verbally reported.

Figure 10:
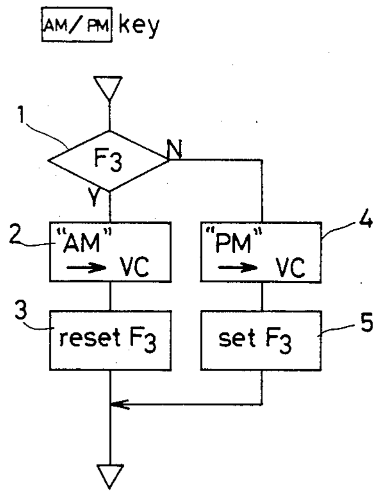

FIG. 10 shows a flow chart when the [AM-PM] key 1-7 is pressed. Whenever this key is pressed in the Set mode, AM and PM can be inverted. Actual state of flag F3 is first detected when the key is pressed (step 1). If it is already set, "AM" will be verbally output (step 2), and so flag F3 is reset (step 3). Conversely, if flag F3 remains reset when the key is pressed, "PM" will be verbally output (step 4), and finally flag F3 is set (step 5). In other words, whenever the [AM/PM] key is operated in the Set mode, "AM" and "PM" are alternately and verbally reported.

Figure 11:
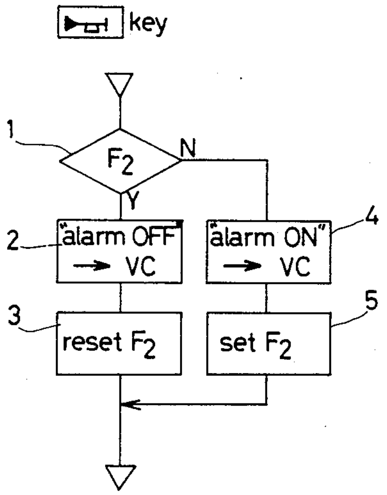

FIG. 11 shows the operational flow chart when the alarm output [ON/OFF] select switch 1-6 is pressed. As in the [AM/PM] inversion key, the alarm output ON/OFF key also inverts. When this key is pressed, actual state of flag F2 is then detected to see if it remains set or reset (step 1), and if it is set, "ALARM OFF" is verbally reported (step 2), and then flag F2 is reset (step 3). If it is reset, "ALARM ON" will be verbally reported (step 4) and then flag F2 will be set (step 5).

Figure 12:
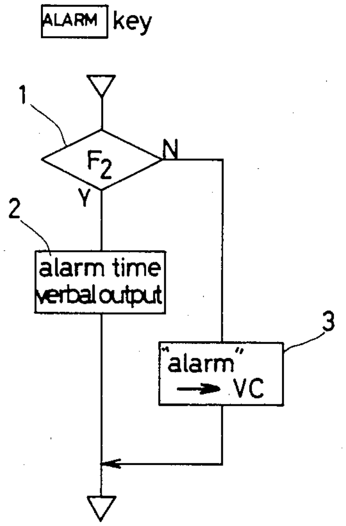

FIG. 12 shows the operational flow chart when the [ALARM] key 1-3 is pressed. When this key is pressed, actual state of flag F2 is detected first (step 1). If it remains set, i.e., if the alarm output is ON, alarm time will be verbally reported (step 2). Conversely, if flag F2 remains reset, "ALARM" will be verbally reported (step 3) so that it merely indicates that the ALARM key is being pressed.

Figure 13:
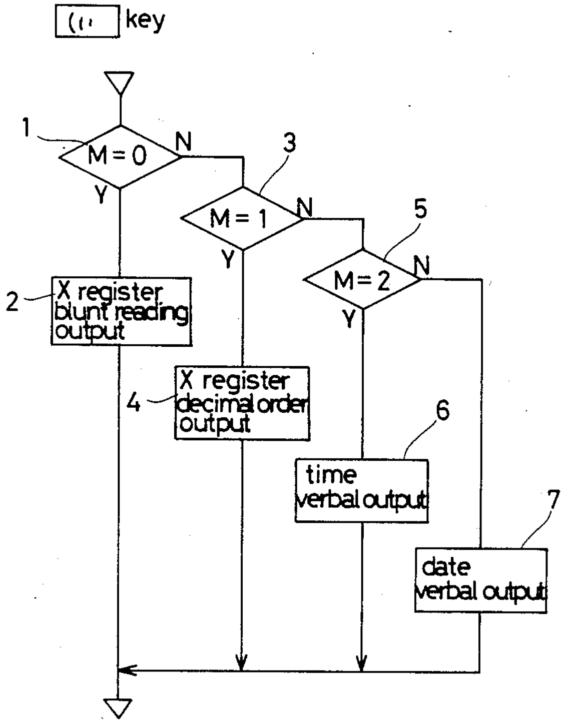

FIG. 13 shows the operational chart when the verbal report instruction key 1-4 is pressed. When this key is pressed, the contents of counter M that determines the contents of the speech output are detected first, and if the contents are read to be zero, then the display contents (contents of register X) are bluntly read out by speech means (steps 1 and 2). If said contents are read to be "1", the display contents will be verbally read out according to the decimal order (steps 3 and 4), and if said contents are read to be "2", the actual time will be verbally reported (steps 5 and 6). If the contents of counter M are read to be of any number other than 0 through 2, then the date will be verbally reported (step 7). All of these operations are summarized in Table 1 below.

TABLE 1

| | Key Operation | Display Output | Speech Output |
|---|---|---|---|
| (1) | (Set Mode) | | |
| | [C. CE] | 0 | |
| (2) | 19810731 | 19810731 | "ONE" "NINE" "EIGHT" "ONE" |
| (3) | [DATE] | 81 - 07 - 31 | "IT'S FRIDAY, JULY THIRTY-FIRST NINETEEN EIGHTY-ONE" |
| | | FRI | |
| (4) | (Normal Mode) | 7 - 42 - 10 PM | "IT'S SEVEN FORTY-TWO PM" |
| | [TIME] | | |
| (5) | [DATE] | 81 - 07 - 31 | "IT'S FRIDAY, JULY THIRTY-FIRST" |
| | | FRI | |
| (6) | [C. CE] | 0 | |
| (7) | 12 | 12 | "ONE" "TWO" |
| (8) | [X] | 12 | "TIMES" |
| (9) | 2 | 2 | "TWO" |
| (10) | [=] | 24 | "TWENTY-FOUR" |

The talking clock calculator embodied by the present invention uses the digital speech data that are used for verbally reporting the time date and also for outputting digital values when the apparatus is being used as an electronic calculator. In addition, the talking clock calculator uses the speech data "IT'S" that are commonly available for verbally reporting the time and date.

As a result, said talking clock calculator can effectively perform the verbal reporting of such desired data as described above without incorporating any large speech data memory capacity.

Whereas the present invention has been described in reference to the preferred emodiments specifically, it will be obvious that a variety of changes and/or modifications may be suggested to those skilled in the art. However, it should be understood that the spirit and scope of the present invention are not limited to such specific embodiments as described above, but are intended to encompass any of such changes and modifications falling within the scope of the following claims.

What is claimed is:

1. A timepiece comprising;

a timekeeping circuit means for keeping time-of-day and calendar information including month, day and year information;

output means connected to said timekeeping circuit means for outputting time-of-day information and calendar information provided thereto by said timekeeping circuit means;

said output means comprising voice synthesizer means for producing audible output of said time-of-day information and said calendar information provided thereto by said timekeeping circuit means and an audible output key for actuating said voice synthesizer means for providing said audible output;

mode selection means connected to said timekeeping circuit and said output means for selectively setting said timepiece in a first mode or a second mode; and a DATE key for actuating said voice synthesizer means in said first mode for outputting said calendar information as audible indications of the month and date only and for actuating said voice synthesizer means in said second mode for outputting said calendar information as audible indications of the year, month, and date .

* * * * *